United States Patent [19]

Long et al.

[11] Patent Number: 4,513,859
[45] Date of Patent: Apr. 30, 1985

[54] CONVEYOR WITH READILY REPLACEABLE ROLLER

[75] Inventors: Wallace H. Long; Ralph Ruggiero, both of Tucson, Ariz.

[73] Assignee: Duval Corporation, Houston, Tex.

[21] Appl. No.: 443,126

[22] Filed: Nov. 19, 1982

[51] Int. Cl.³ .............................................. B65G 39/10
[52] U.S. Cl. ..................................... 198/842; 198/862
[58] Field of Search ................................ 198/824–828, 198/830, 842, 866, 782, 780, 862

[56] References Cited

U.S. PATENT DOCUMENTS

| | | |
|---|---|---|
| 378,516 | 2/1888 | Oliver . |
| 525,419 | 9/1894 | Hoyt . |
| 527,223 | 10/1894 | Springer . |
| 616,254 | 12/1898 | Philips . |
| 706,197 | 8/1902 | Owen . |
| 842,900 | 2/1907 | Morenus et al. . |
| 928,183 | 7/1909 | Cunningham . |
| 1,096,307 | 5/1914 | Kirksey . |
| 1,276,724 | 8/1918 | Cowley . |
| 1,301,642 | 4/1918 | Bradney et al. . |
| 1,548,497 | 8/1925 | Weeks . |
| 1,636,680 | 7/1927 | Cannon . |
| 1,693,343 | 11/1928 | Morgan . |
| 1,950,501 | 3/1934 | MacKay . |
| 1,986,596 | 6/1935 | Norris . |
| 2,144,384 | 1/1939 | Mikan . |
| 2,529,684 | 11/1950 | Gass . |
| 2,609,152 | 9/1952 | Brough . |
| 2,693,269 | 11/1954 | Bentley . |
| 2,711,858 | 6/1955 | Kennedy . |
| 2,798,589 | 7/1957 | Wood . |
| 3,211,277 | 10/1965 | Knapp et al. ........................ 198/824 |
| 3,358,855 | 12/1967 | Carlton et al. . |
| 3,385,014 | 5/1968 | Haug . |
| 3,490,632 | 1/1970 | McKinney . |
| 3,545,690 | 12/1970 | Burian et al. . |
| 3,598,224 | 8/1971 | Oury . |
| 3,599,378 | 8/1971 | Kachnic . |
| 3,877,568 | 4/1975 | Breiling et al. ...................... 198/842 |

FOREIGN PATENT DOCUMENTS 698855  11/1979  U.S.S.R. ............................ 198/824

OTHER PUBLICATIONS

Weserhutte—Mobilbrecher—Reference List.
Krupp—Mobile Crushing Installations—Reference List.

Primary Examiner—Joseph E. Valenza
Attorney, Agent, or Firm—Stevens, Davis, Miller & Mosher

[57] ABSTRACT

An endless belt conveyor having readily replaceable support rollers. In an endless conveyor support structure, support rollers are carried on a cross bar which is releasably secured to the underside of I-beams in the conveyor frame. Hoists are provided so that the cross bar may be lowered and then moved laterally so that the roller to be replaced is clear of the conveyor structure.

9 Claims, 3 Drawing Figures

CONVEYOR WITH READILY REPLACEABLE ROLLER

BACKGROUND OF THE INVENTION

1. Field of the Invention

The present invention relates to an endless conveyor and the support structure for such a conveyor. More particularly, the present invention is related to an endless conveyor for conveying large amounts of heavy materials, which has readily replaceable rollers. Such conveyors can be used, for example, in apron feeders as part of open pit mining operations to convey rocks from a truck unloading station to a rock crusher. Such a system is shown in Ser. No. 379,512 filed May 18, 1982.

2. Description of the Prior Art

Previously, rollers for the heavy duty endless conveyors described above have been supported on top of the conveyor frame structure. This has caused inconvenience in replacing rollers as they became worn. To replace rollers, it was necessary to dismantle the endless belt to obtain access to the rollers. This in turn has required that the belt be unloaded before changing rollers. This has resulted in extended periods of downtime when it became necessary to replace rollers.

SUMMARY OF THE INVENTION

It is an object of this invention to provide an endless conveyor system which is provided with rollers which may be readily replaced without difficulty or undue delay.

The above object and others are obtained by providing an endless conveyor in which the cross bar which carries the support rollers of the conveyor is releasably connected to the bottom flange of I-beams of the conveyor frame structure. Hoists may be provided to lower the cross bar and rollers and move the cross bar and rollers laterally to be clear of the frame structure. The worn roller can then be readily replaced and the conveyor can be returned to service with a minimum of delay.

BRIEF DESCRIPTION OF THE DRAWINGS

The present invention can be more fully understood through the following description and appended claims when read in conjunction with the drawings, wherein:

DETAILED DESCRIPTION OF THE INVENTION

Figure 1:
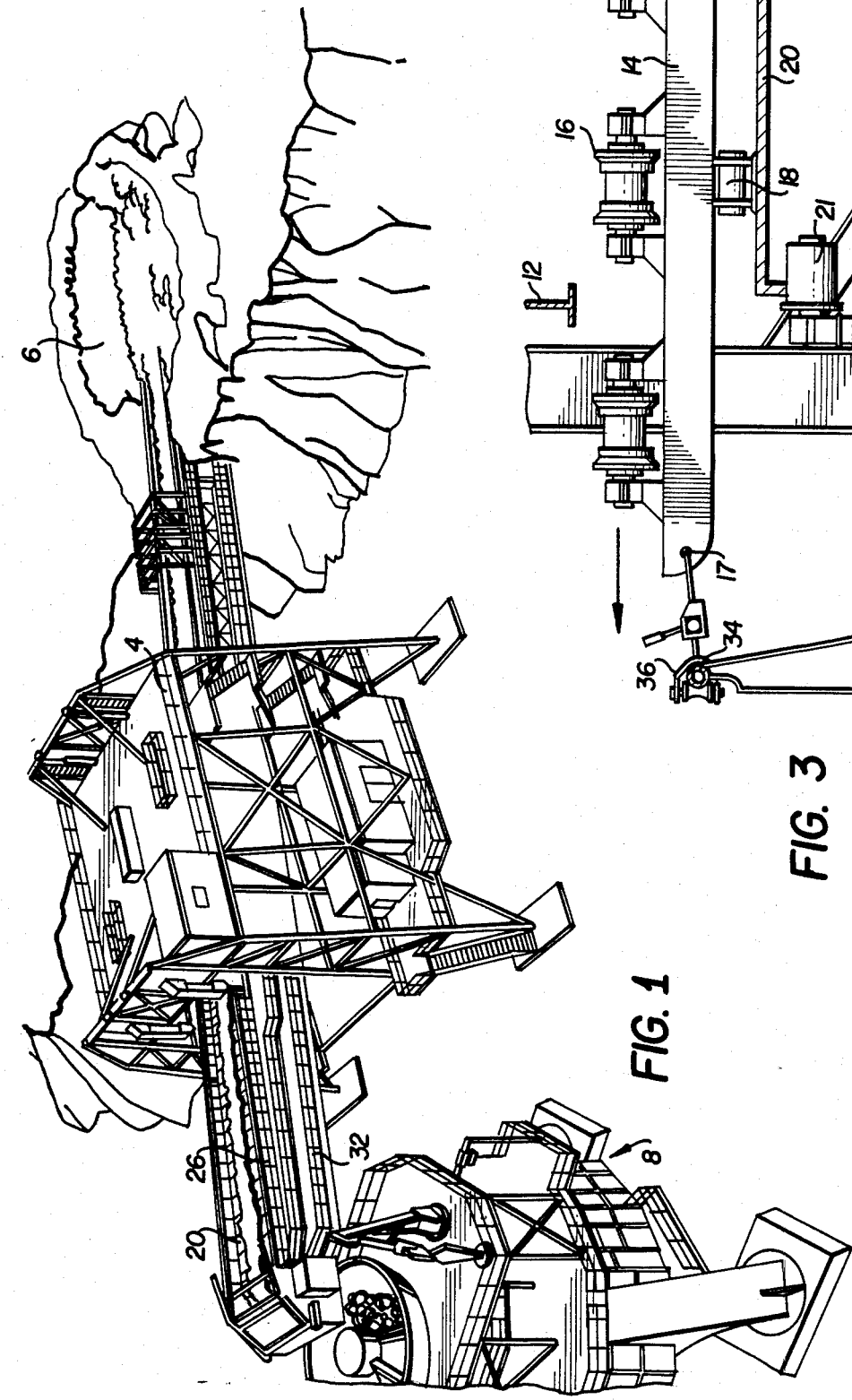
FIG. 1 is a perspective view of an open pit mine including a conveyor according to the present invention.

As can be seen in FIG. 1, the endless conveyor of the present invention may be used in an apron feeder for open pit mining operations. The feeder 4 is used to transport rock or ore from a dump truck unloading station 6 to a gyratory rock crusher 8. The pieces carried by the feeder are generally several feet in diameter and extremely heavy. The apron feeder uses an apron conveyor having heavy, overlapping metal plates which are carried by several loops of chain. These chains are driven to move the plates and thus carry any material piled on the plates. Because of the extremely heavy load carried, the upper (or feed) run of the apron conveyor is supported by a large number of rollers, which are disposed on closely spaced bars which extend laterally across the frame. The endless belt is generally about 13 feet wide. The rollers, which may weigh 300 pounds each, are subject to extreme wear because of the high loads. Thus, it would be advantageous if these rollers could be replaced without dismantling the apron plates and chain, yet still providing the support necessitated by the heavy loads.

Figure 3:
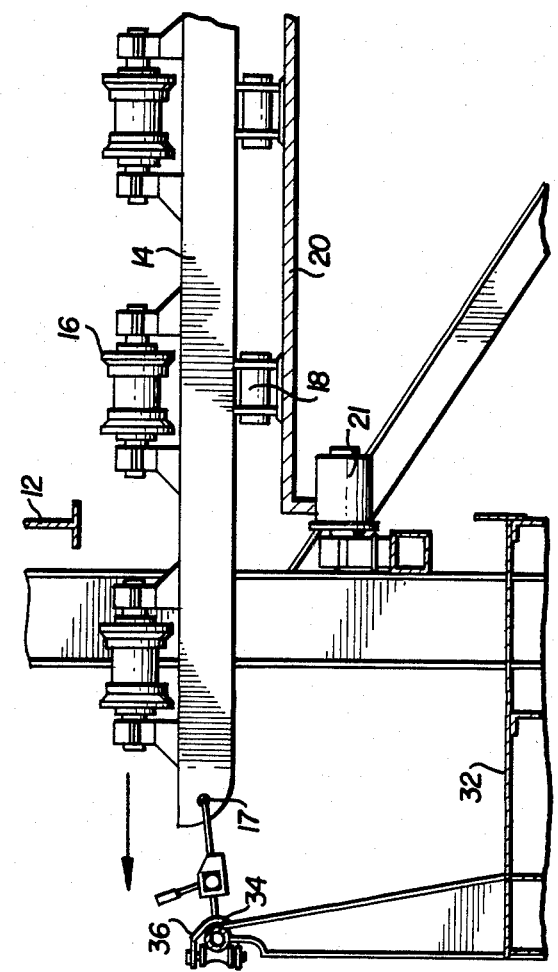
FIG. 3 is a lateral cross sectional view of part of the conveyor shown in FIG. 2 during replacement of a roller.
Figure 2:
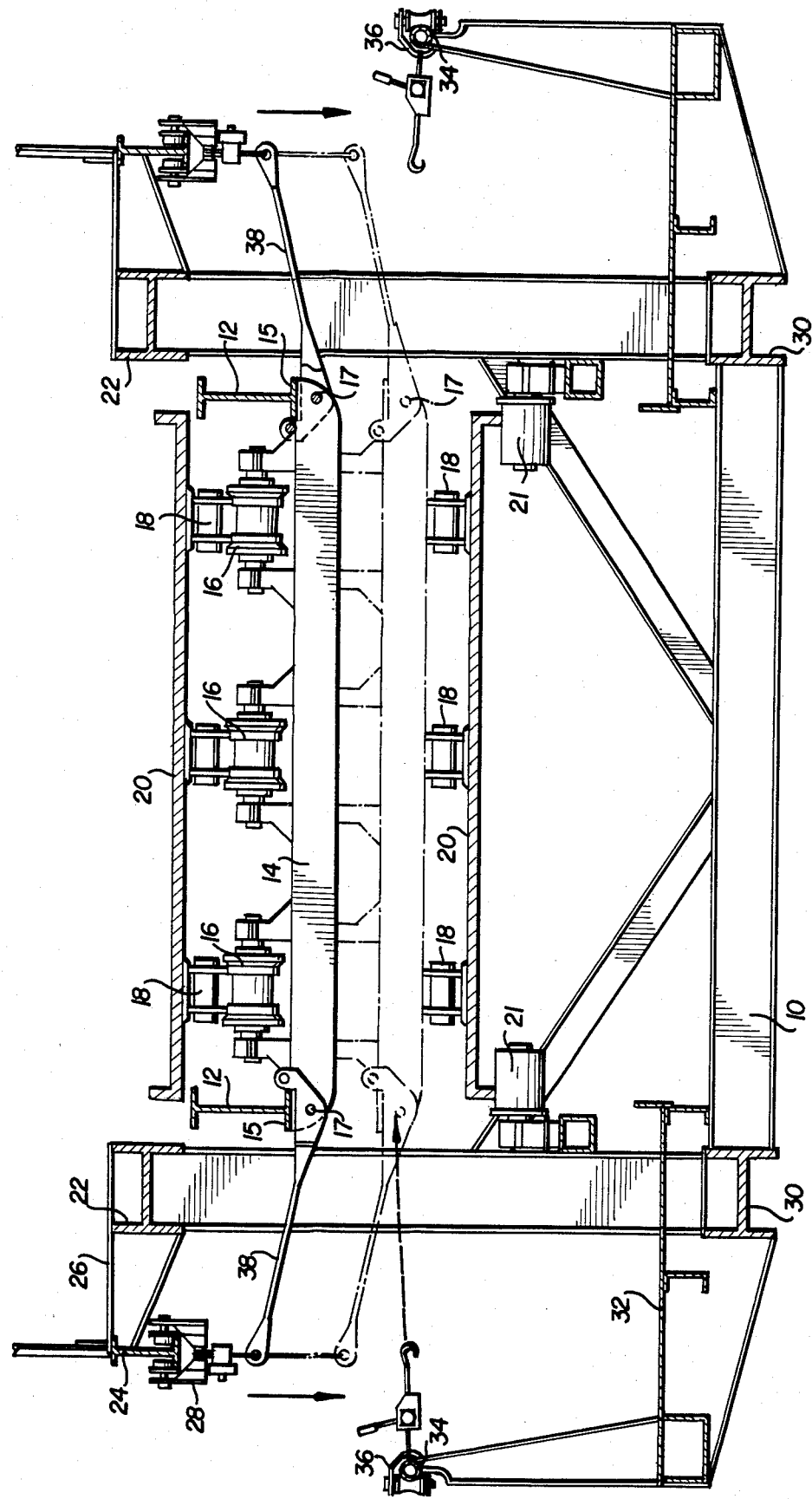
FIG. 2 is a lateral cross sectional view of the conveyor of FIG. 1 showing the structure of the conveyor in detail.

Referring now to FIGS. 2 and 3, the frame structure 10 of the conveyor includes I-beams 12. A roller carrying a bar 14 is secured to the underside of the I-beams through bolts 15. The bar 14 may be provided with a flange to accomplish this. Other methods for releasably securing this roller carrying bar to the bottom of the I-beam could also be used. The roller carrying bar supports rollers 16 and is provided with apertures 17. The endless belt of this conveyor includes link chains 18 to which overlapping pans 20 are secured. The upper pan 20 of FIG. 2 is shown in the feed or carrying position while the lower pan 20 is shown in the return or empty position. It is preferred that the feed and return runs of the endless belt be substantially parallel. The pans in the return run rest on rollers 21, which support a much lighter load than the rollers 16 support.

The frame is provided with an upper H-beam 22 and I-beam 24 which support an upper observation walkway 26 which is provided with a handrail. A trolley and hoist combination 28 rides on the lower flange of the I-beam. Combination 28 may be a one-half ton monorail trolley with hoist.

A lower H-beam 30 may be provided which supports a lower observation walkway 32. A heavy rail 34 may be provided which carries roller and hoist combination 36. I-beam 24 and rail 34 may be provided with means to limit the movement of combinations 28 and 36. This could be accomplished by providing holes in beam 24 and rail 34 in which heavy pins could be inserted. Clamping could also be used.

The replacement of one of the rollers 16 on bar 14 will now be described. Connecting members 38 are secured to the bar 14, which is bolted to the underside of I-beam 15. These connecting members permit hoists 28 to operate on the bar 14. Of course, it would be possible to construct the bar 14 or position the hoists 28 so that connecting member 38 would not be necessary.

After the connecting members are in place, the hoists 28 are hooked up to the connecting members and lift is exerted on the connecting members. This relieves the strain from bolts 15 so that the bar 14 may be released from I-beam 12. The hoists are then used to lower bar 14 until it rests on the return of the endless belt. This is shown in phantom in FIG. 2. The hoists 28 are then disengaged and the connecting members 38 are removed from the bar 14. At this point, the hoists 36 are connected to the bar 14 through apertures 17. The hoists are used to laterally slide the bar 14 so that the roller which must be replaced is clear of the frame structure (FIG. 3). The distance from at least one of the hoists to the nearest I-beam 12 is preferably such that the bar 14 can be moved enough so that the middle roller 16 is readily accessible. Once clear of the frame structure, the roller may be readily replaced. For example, a crane could be used to lift the worn roller and to bring the replacement roller into position.

Once the new roller has been put in place on the bar 14, one of the hoists 36 is used to move bar 14 back into position within the frame structure. Connecting members 38 may be reattached to the bar 14 and hoists 28 can be hooked up to the connecting members. The bar 14 can again be lifted into position and secured to the underside of I-beam 12. Thus, to replace a roller, it is not necessary to unload and dismantle the endless belt when the presently claimed invention is used. Furthermore, the roller to be replaced can be moved clear of the frame structure of the conveyor, which allows easier access to and replacement of the roller.

Although a specific preferred embodiment of the present invention has been described above, modifications thereof will be apparent to those of ordinary skill in the art. The above description is not intended to be limiting of the present invention, the scope and extent of which is defined in the following claims.

What is claimed is:

1. A conveyor, comprising:
   a substantially horizontal support frame comprising spaced first and second parallel horizontal members;
   a roller-carrying bar extending between said first and second members, releasably secured to the undersides of said first and second members;
   roller means secured on top of said roller-carrying bar;
   an endless belt encircling said bar, and having a feed run supported by said roller means and a return run;
   means for supporting said bar to allow said bar to be released from said first and second members and for lowering said bar so that said roller means is vertically clear of said first and second members; and
   means for laterally moving said bar substantially perpendicular to said first and second members to move said roller means clear of said first and second members.

2. A conveyor as claimed in claim 1, wherein said means for supporting and lowering said bar includes a hoist.

3. A conveyor as claimed in claim 1, wherein said means for laterally moving includes a hoist.

4. A conveyor as claimed in claim 1, wherein said feed run and said return run are substantially parallel and said means for supporting and lowering allows said bar to rest on said return run.

5. A conveyor as claimed in claim 4, wherein said endless belt comprises a chain which contacts said roller means and a plurality of pans secured to said chain.

6. A conveyor as claimed in claim 5, further comprising two return rollers which support the sides of the pans of said return run.

7. A conveyor as claimed in claim 2, further comprising track means parallel and adjacent to said feed run; and a trolley movably carried on said track means, said trolley carrying said hoists.

8. A conveyor as claimed in claim 7, wherein said track means further comprises means for limiting movement of said trolley.

9. A conveyor as claimed in claim 3, further comprising hoist support means adjacent and parallel to said return run for movably carrying said hoist.

* * * * *